(12) United States Patent
Park et al.

(10) Patent No.: US 12,356,215 B2
(45) Date of Patent: Jul. 8, 2025

(54) METHOD AND APPARATUS FOR BEAM-BASED COMMUNICATION IN COMMUNICATION SYSTEM

(71) Applicant: Electronics and Telecommunications Research Institute, Daejeon (KR)

(72) Inventors: Soon Gi Park, Daejeon (KR); Jun Sik Kim, Daejeon (KR); Sung Cheol Chang, Daejeon (KR); Sun Mi Jun, Daejeon (KR); Yong Seouk Choi, Daejeon (KR); Duk Kyung Kim, Seoul (KR); Gwang Hae Kim, Incheon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 412 days.

(21) Appl. No.: 17/976,067

(22) Filed: Oct. 28, 2022

(65) Prior Publication Data
US 2023/0136920 A1      May 4, 2023

(30) Foreign Application Priority Data

Oct. 29, 2021 (KR) .......................... 10-2021-0146655
Oct. 28, 2022 (KR) .......................... 10-2022-0141349

(51) Int. Cl.
*H04W 16/28*      (2009.01)

(52) U.S. Cl.
CPC .................................. *H04W 16/28* (2013.01)

(58) Field of Classification Search
CPC ............................ H04W 16/28; H04B 7/0695
See application file for complete search history.

(56) References Cited

U.S. PATENT DOCUMENTS

| 9,521,605 B2 | 12/2016 | Oh et al. |
| 9,578,580 B1 | 2/2017 | Ishfaq et al. |
| 9,867,091 B2 | 1/2018 | Jo et al. |

(Continued)

OTHER PUBLICATIONS

Younghoon Jo et al., "Mobility Management Based on Beam-level Measurement Report in 5G Massive MIMO Cellular Networks", MDPI, May 23, 2020, pp. 1-16.

*Primary Examiner* — Eric Myers
(74) *Attorney, Agent, or Firm* — KILE PARK REED & HOUTTEMAN PLLC

(57) ABSTRACT

An operation method of a terminal in a communication system may comprise: obtaining a plurality of serving beam measurement values by performing measurement on a plurality of serving beams; identifying a minimum measurement value among the plurality of serving beam measurement values; obtaining a plurality of beam measurement values by performing measurement on a plurality of beams received from a plurality of base stations included in the communication system; determining whether a first condition is satisfied, the first condition being defined based on a result of comparison between the plurality of beam measurement values and a sum of the minimum measurement value and a first offset; and in response to determining that the first condition satisfied, performing communication with at least part of the plurality of serving base stations and a first base station forming a first beam satisfying the first condition.

20 Claims, 8 Drawing Sheets

(56) References Cited

U.S. PATENT DOCUMENTS

| | | |
|---|---|---|
| 10,219,259 B2 | 2/2019 | Kubota et al. |
| 10,477,425 B2 | 11/2019 | Costa et al. |
| 2016/0183234 A1 | 6/2016 | Sung et al. |
| 2017/0215116 A1 | 7/2017 | Siravuru et al. |
| 2017/0332371 A1* | 11/2017 | Kubota ................ H04L 5/0073 |
| 2021/0075474 A1 | 3/2021 | Raghavan et al. |
| 2021/0329515 A1 | 10/2021 | Sharma et al. |
| 2023/0239847 A1* | 7/2023 | Abotabl .............. H04W 72/232 |
| | | 370/329 |
| 2024/0196272 A1* | 6/2024 | Bruhn ............... H04W 28/0236 |

* cited by examiner

METHOD AND APPARATUS FOR BEAM-BASED COMMUNICATION IN COMMUNICATION SYSTEM

CROSS-REFERENCE TO RELATED APPLICATIONS

This application claims priority to Korean Patent Applications No. 10-2021-0146655, filed on Oct. 29, 2021, and No. 10-2022-0141349, filed on Oct. 28, 2022, with the Korean Intellectual Property Office (KIPO), the entire contents of which are hereby incorporated by reference.

BACKGROUND

1. Technical Field

Exemplary embodiments of the present disclosure relate to a beam-based communication technique in a communication system, and more particularly, to a beam-based communication technique for improving communication reliability in a communication system using multiple beams.

2. Related Art

With the development of information and communication technology, various wireless communication technologies are being developed. Representative wireless communication technologies include long term evolution (LTE) and new radio (NR) defined as the $3^{rd}$ generation partnership project (3GPP) standards. The LTE may be one of $4^{th}$ generation (4G) wireless communication technologies, and the NR may be one of $5^{th}$ generation (5G) wireless communication technologies.

For processing of rapidly increasing wireless data, the 5G NR communication or later wireless communication technology may support communication in a relatively high frequency band. For example, radio frequency bands used for wireless communication may be largely classified into a frequency range 1 (FR1) band and a frequency range 2 (FR2) band. Here, the FR1 band may mean a relatively low frequency band of 7 GHz or below. The FR2 band may mean a relatively high frequency band of 7 GHz or above. The FR2 band may include a 28-29 GHz band, an unlicensed band, a millimeter wave band, a terahertz wave band, and the like.

In a high frequency band such as a millimeter wave band and a terahertz wave band, a path loss may occur at a relatively high level. In order to compensate for the path loss, an exemplary embodiment of a communication system using a high frequency band may support beam-based communication using a narrow beam having a high antenna gain. Based on beam-based communication, one or more communication nodes may perform communication with another communication node using multiple beams. Through this, the transmission speed in the communication system can be improved. However, in beam-based communication, problems such as blockage or deterioration of communication quality due to obstacles in a communication environment (hereinafter referred to as communication obstacles) may occur frequently. As a result, beam switching (BS) and handover (HO) may occur frequently, and link reliability may be deteriorated. A technique for improving link reliability in beam-based communication may be required.

Matters described as the prior arts are prepared to help understanding of the background of the present disclosure, and may include matters that are not already known to those of ordinary skill in the technology domain to which exemplary embodiments of the present disclosure belong.

SUMMARY

Accordingly, exemplary embodiments of the present disclosure are provided to substantially obviate one or more problems due to limitations and disadvantages of the related art.

Exemplary embodiments of the present disclosure are directed to providing a beam-based communication method and apparatus for improving communication reliability and/or communication stability based on multi-connectivity in a communication system using multiple beams.

According to a first exemplary embodiment of the present disclosure, an operation method of a terminal in a communication system may comprise: obtaining a plurality of serving beam measurement values by performing measurement on a plurality of serving beams received from a plurality of serving transmission and reception points (TRPs) providing a service to the terminal; identifying a minimum measurement value among the plurality of serving beam measurement values; obtaining a plurality of beam measurement values by performing measurement on a plurality of beams received from a plurality of TRPs included in the communication system; determining whether a first condition is satisfied, the first condition being defined based on a result of comparison between the plurality of beam measurement values and a sum of the minimum measurement value and a first offset; and in response to determining that the first condition satisfied, performing communication with at least part of the plurality of serving TRPs and a first TRP forming a first beam satisfying the first condition.

The determining of whether the first condition is satisfied may comprise: determining that the first condition is satisfied when there is one or more measurement values greater than the sum of the minimum measurement value and the first offset among the plurality of beam measurement values.

The determining of whether the first condition is satisfied may comprises determining that the first condition is satisfied when there is one or more measurement values that are greater than the sum of the minimum measurement value and the first offset and do not correspond to the plurality of serving TRPs among the plurality of beam measurement values.

The determining of whether the first condition is satisfied may comprise: when there are a plurality of measurement values satisfying the first condition, performing comparison between priorities of a plurality of candidate beams corresponding to the plurality of measurement values satisfying the first condition based on one or more criteria; and determining the first beam among the plurality of candidate beams based on a result of the comparison between the priorities.

The one or more criteria may include at least one of a first criterion according to TRP classification, a second criterion according to a measurement value size, and a third criterion according to a comparison result with respect to a beam switching probability or a handover probability.

The obtaining of the plurality of beam measurement values may comprise: determining a size of a beam search space for each of the plurality of TRPs; identifying a beam search space for each of the plurality of TRPs based on the determined size of the beam search space size; and identifying the plurality of beam measurement values by performing measurement on the plurality of beams received from the plurality of TRPs based on the identified beam search spaces.

The determining of the size of the beam search space may comprise: identifying a search reference beam for each of the plurality of TRPs; identifying whether the search reference beam for each of the plurality of TRPs satisfies a line-of-sight (LoS) condition or non-LoS (NLoS) condition; and determining the size of the beam search space based on a result of the identifying of whether the search reference beam satisfies the LoS condition or NLoS condition.

The performing of the communication may comprise: identifying whether the first TRP forming the first beam is identical to any one of the plurality of serving TRPs; and performing a handover procedure from a second TRP to the first TRP when the first TRP is not identical to any one of the plurality of serving TRPs, the second TRP forming a second beam corresponding to the minimum measurement value.

The performing of the communication may comprise: identifying first information on the first TRP after performing the handover procedure to the first TRP; and determining a number of TRPs to which the terminal is simultaneously connected, based on the identified first information.

The performing of the communication may comprise: identifying whether the first TRP forming the first beam is identical to any one of the plurality of serving TRPs; and performing a beam switching procedure from a second beam corresponding to the minimum measurement value to the first beam, when the first TRP is identical to a second TRP forming the second beam among the plurality of serving TRPs.

The operation method may further comprise, after the determining of whether the first condition is satisfied, in response to determining that the first condition is not satisfied, maintaining connections to the plurality of serving TRPs and the plurality of serving beams.

Each of the plurality of serving beam measurement values and the plurality of beam measurement values may correspond to a Reference Signal Received Power (RSRP) measured based on a signal received through a corresponding beam.

The operation method may further comprise, before the obtaining of the plurality of beam measurement values, receiving second information from a third TRP among the plurality of serving TRPs; and identifying the received second information, wherein the second information includes information instructing the terminal to determine whether the first condition is satisfied based on the measurement on the plurality of beams.

According to a second exemplary embodiment of the present disclosure, a terminal in a communication system may comprise a processor, wherein the processor causes the terminal to: obtain a plurality of serving beam measurement values by performing measurement on a plurality of serving beams received from a plurality of serving TRPs providing a service to the terminal; calculate an aggregated measurement value corresponding to a sum of the plurality of serving beam measurement values; obtain a plurality of beam measurement values by performing measurement on a plurality of beams received from a plurality of TRPs included in the communication system; determine whether a first condition is satisfied, the first condition being defined based on a result of comparison between the plurality of beam measurement values and a sum of the aggregated measurement value and a first offset; and in response to determining that the first condition satisfied, perform communication with at least part of the plurality of serving TRPs and a first TRP forming a first beam satisfying the first condition.

In the determining of whether the first condition is satisfied, the processor may further cause the terminal to determine that the first condition is satisfied, when there is one or more measurement values greater than the sum of the aggregated measurement value and the first offset among the plurality of beam measurement values.

In the performing of the communication, the processor may further cause the terminal to perform one of handover or beam switching based on a result of determining whether the first TRP forming the first beam is identical to any one of the plurality of serving TRPs.

According to a third exemplary embodiment of the present disclosure, an operation method of a first TRP in a communication system may comprise: transmitting first information to a terminal to which a plurality of serving TRPs including the first TRP provide a service; and performing communication with the terminal based on a result of determination on whether a first condition is satisfied, the determination being performed by the terminal based on the first information, wherein the first condition is defined based on a result of comparison between a first reference value and a plurality of beam measurement values obtained by performing measurement on a plurality of beams received from a plurality of TRPs included in the communication system, the first reference value being determined based on a plurality of serving beam measurement values that the terminal obtains by performing measurement on a plurality of serving beams received from the plurality of serving TRPs, and wherein the first information includes information instructing the terminal to determine whether the first condition is satisfied based on the measurement on the plurality of beams.

The information instructing to determine whether the first condition is satisfied may instruct the terminal to determine that the first condition is satisfied when there is one or more measurement values greater than the first reference value among the plurality of beam measurement values, and the first reference value may be defined as one of a sum of a first offset and a minimum measurement value among the plurality of serving beam measurement values or a sum of a second offset and an aggregated measurement value corresponding to a sum of the plurality of serving beam measurement values.

The first information may further include information related to a size of a beam search space for each of the plurality of TRPs, the beam search space being for the terminal to perform the measurement on the plurality of beams, and the size of the beam search space may be determined based on whether a search reference beam for each of the plurality of TRPs satisfies a line-of-sight (LoS) condition or non-LoS (NLoS) condition.

The first information may further include information instructing the terminal to perform one of handover or beam switching based on a result of determining whether a second TRP forming a first beam satisfying the first condition is identical to any one of the plurality of serving TRPs.

According to the exemplary embodiments of the beam-based communication method and apparatus, in a communication system using a multi-beam, a UE may be connected to one or more serving beams formed by one or more serving TRPs at the same time based on multi-connectivity. The UE can efficiently determine whether to perform beam switching or handover, whether to maintain a serving beam, and/or the like by comparing measurement values for the one or more serving beams received from the one or more serving TRPs and measurement values for other received beams. Meanwhile, the UE can reduce a time required for beam search and improve efficiency of beam search operations by flexibly determining the size of a beam/TRP search space for beam and/or TRP search.

DETAILED DESCRIPTION OF THE EMBODIMENTS

Figure 1:
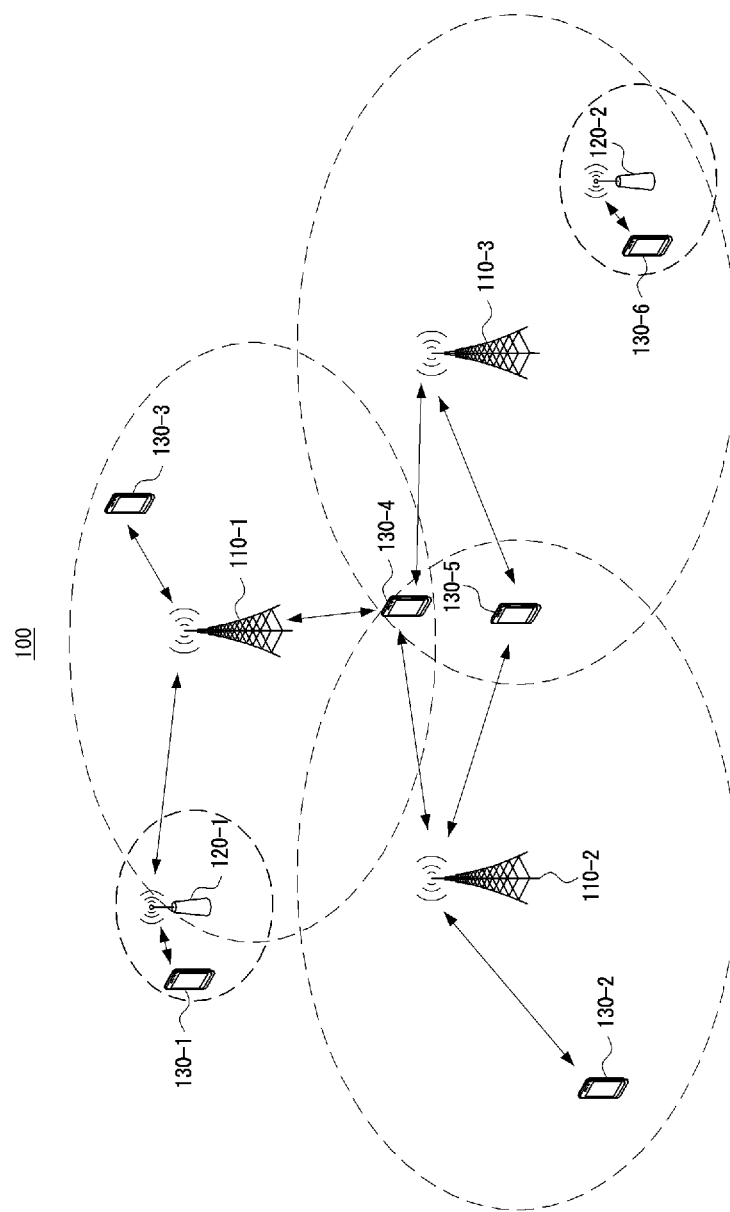
FIG. 1 is a conceptual diagram illustrating a first exemplary embodiment of a communication system.

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may have the same meaning as a communication network.

Throughout the present disclosure, a network may include, for example, a wireless Internet such as wireless fidelity (WiFi), mobile Internet such as a wireless broadband Internet (WiBro) or a world interoperability for microwave access (WiMax), 2G mobile communication network such as a global system for mobile communication (GSM) or a code division multiple access (CDMA), 3G mobile communication network such as a wideband code division multiple access (WCDMA) or a CDMA2000, 3.5G mobile communication network such as a high speed downlink packet access (HSDPA) or a high speed uplink packet access (HSUPA), 4G mobile communication network such as a long term evolution (LTE) network or an LTE-Advanced network, 5G mobile communication network, or the like.

Throughout the present disclosure, a terminal may refer to a mobile station, mobile terminal, subscriber station, portable subscriber station, user equipment, access terminal, or the like, and may include all or a part of functions of the terminal, mobile station, mobile terminal, subscriber station, mobile subscriber station, user equipment, access terminal, or the like.

Here, a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like having communication capability may be used as the terminal.

Throughout the present specification, the base station may refer to an access point, radio access station, node B (NB), evolved node B (eNB), base transceiver station, mobile multihop relay (MMR)-BS, or the like, and may include all or part of functions of the base station, access point, radio access station, NB, eNB, base transceiver station, MMR-BS, or the like.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. The plurality of communication nodes may support 4th generation (4G) communication (e.g., long term evolution (LTE), LTE-advanced (LTE-A)), 5th generation (5G) communication (e.g., new radio (NR)), or the like. The 4G communication may be performed in a frequency band of 6 gigahertz (GHz) or below, and the 5G communication may be performed in a frequency band of 6 GHz or above.

For example, for the 4G and 5G communications, the plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like.

In addition, the communication system 100 may further include a core network. When the communication system 100 supports the 4G communication, the core network may comprise a serving gateway (S-GW), a packet data network (PDN) gateway (P-GW), a mobility management entity (MME), and the like. When the communication system 100 supports the 5G communication, the core network may comprise a user plane function (UPF), a session management function (SMF), an access and mobility management function (AMF), and the like.

Meanwhile, each of the plurality of communication nodes 110-1, 110-2, 110-3, 120-1, 120-2, 130-1, 130-2, 130-3, 130-4, 130-5, and 130-6 constituting the communication system 100 may have the following structure.

Figure 2:
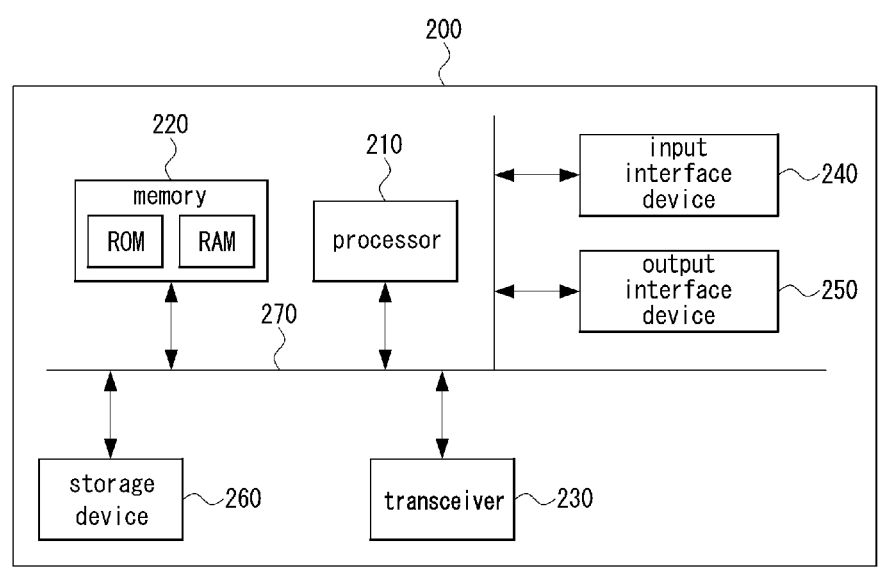
FIG. 2 is a block diagram illustrating a first exemplary embodiment of a communication node constituting a communication system.

FIG. 2 is a block diagram illustrating a first embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 including the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a base transceiver station (BTS), a radio base station, a radio transceiver, an access point, an access node, a road side unit (RSU), a radio remote head (RRH), a transmission point (TP), a transmission and reception point (TRP), an eNB, a gNB, or the like.

Here, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, an Internet of things (IoT) device, a mounted apparatus (e.g., a mounted module/device/terminal or an on-board device/terminal, etc.), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support multi-input multi-output (MIMO) transmission (e.g., a single-user MIMO (SU-MIMO), multi-user MIMO (MU-MIMO), massive MIMO, or the like), coordinated multipoint (CoMP) transmission, carrier aggregation (CA) transmission, transmission in an unlicensed band, device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2, and operations supported by the plurality of base stations 110-1, 110-2, 110-3, 120-1, and 120-2. For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, beam-based communication methods in a communication system will be described. Even when a method (e.g., transmission or reception of a data packet) performed at a first communication node among communication nodes is described, the corresponding second communication node may perform a method (e.g., reception or transmission of the data packet) corresponding to the method performed at the first communication node. That is, when an operation of a receiving node is described, a corresponding transmitting node may perform an operation corresponding to the operation of the receiving node. Conversely, when an operation of a transmitting node is described, a corresponding receiving node may perform an operation corresponding to the operation of the transmitting node.

Figure 3:
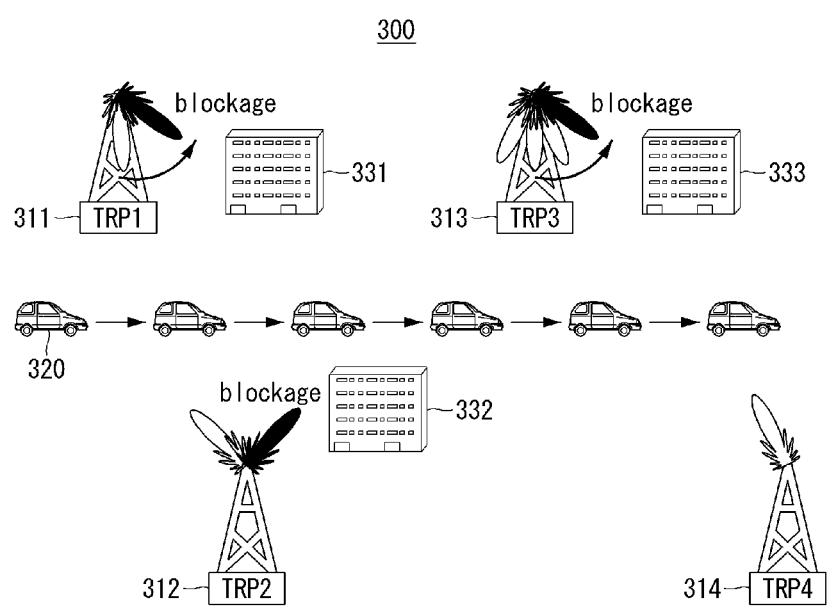
FIG. 3 is a conceptual diagram illustrating a second exemplary embodiment of a communication system.

FIG. 3 is a conceptual diagram illustrating a second exemplary embodiment of a communication system.

Referring to FIG. 3, in the second exemplary embodiment of the communication system, a communication system 300 may support beam-based communication. The communication system 300 may be a cellular communication system. At least some of communication nodes constituting the communication system 300 may perform communication with other communication nodes using a single beam or multiple beams (i.e., multi-beam).

For example, an exemplary embodiment of the communication system 300 may include one or more transmission and reception points (TRPs). An exemplary embodiment of the communication system 300 may include a TRP1 311, a TRP2 312, a TRP3 313, a TRP4 314, and a user equipment (UE) 320. The TRP1 to TRP4 may be the same as or similar to the TRP described with reference to FIG. 1. The TRP may correspond to a base station. Alternatively, the TRP may serve to relay a connection between the base station and the UE. For example, the UE may be connected to one or more base stations via one or more TRPs.

The UE 320 may be the same as or similar to each of the plurality of terminals 130-1, 130-2, 130-3, 130-4, 130-5, and 130-6 described with reference to FIG. 1. The TRP1 to TRP4 and the UE 320 may be the same as or similar to the communication node 200 described with reference to FIG. 2. Meanwhile, various types of communication obstacles 331, 332, and 333 such as buildings, people, and other structures may exist in a communication environment. The UE 320 may be connected to or access to any one of the TRP1 to TRP4. The UE 320 may be connected to a communication network or a core network (CN) by being connected to any one of the TRP1 to TRP4.

Any one of the TRP1 to TRP4 may be connected to the UE 320 by forming a multi-beam, thereby providing a service to the UE 320. The TRP that is connected to the UE 320 and provides a service may be referred to as a 'serving TRP'. A beam used for the service to the UE 320 among multiple beams formed by the serving TRP may be referred to as a 'serving beam'.

According to a 'communication environment condition', a serving TRP and/or a serving beam for the UE 320 may be determined. Here, the communication environment condition may be determined based on absolute or relative positions of the communication nodes 311, 312, 313, 314, and 320 and the communication obstacles 331, 332, and 333 in the communication environment. For example, one of the TRP1 to TRP4, which has a relatively close distance to the UE 320 or has a relatively excellent communication quality with the UE 320, may be determined as a serving TRP. Among beams formed by a serving TRP, one beam having a relatively excellent reception quality at the UE 320 may be determined as a serving beam.

As the UE 320 and/or the communication obstacles 331, 332, and/or 333 move, the serving TRP and/or serving beam for the UE 320 may change. For example, when the UE 320 moves while being connected to the TRP1, the UE 320 may deviate from a direction in which the existing serving beam is directed. In this case, the serving beam for the UE 320 may be replaced with a beam formed by the TRP1 in the direction of the UE 320 at that time. As such, the replacement of the serving beam for the UE 320 may be referred to as 'beam switching (BS)'. Meanwhile, as the UE 320 moves, the serving beam for the UE 320 may be blocked by the communication obstacle 331, or the reception quality at the UE 320 may be deteriorated. In this case, the UE 320 may connect to the TRP2 instead of the TRP1. In this manner, the change of the serving TRP to which the UE 320 is connected may be referred to as 'handover (HO)'. The handover may also be referred to as a 'handoff'.

In the communication system 300 supporting a single beam, problems such as blockage or degradation of communication quality due to communication obstacles in the communication environment may occur frequently. Due to these, beam switching and handover may occur frequently, and link reliability may be deteriorated. A technique for improving link reliability in beam-based communication may be required.

Figure 4:
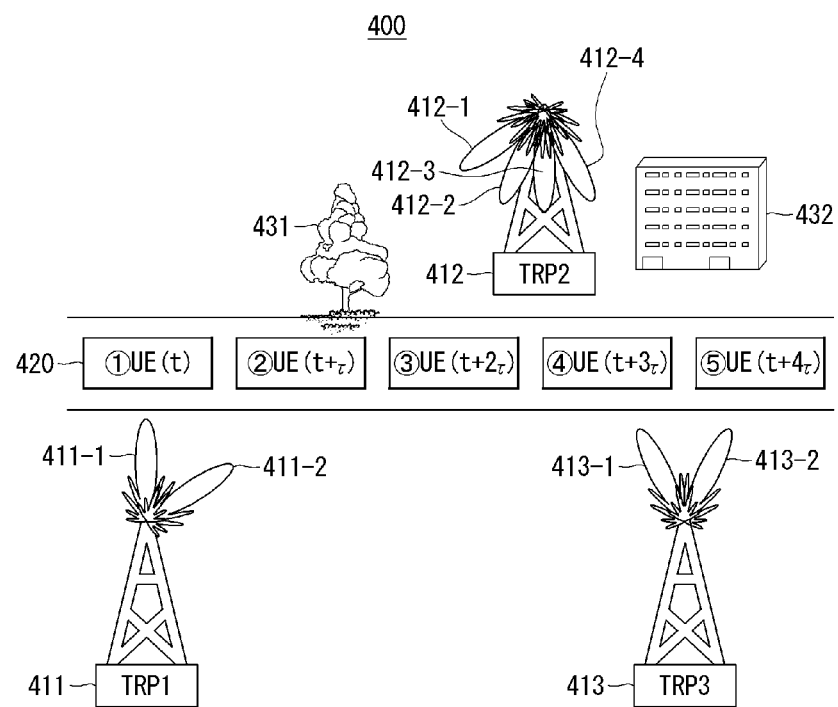
FIG. 4 is a conceptual diagram illustrating a third exemplary embodiment of a communication system.

FIG. 4 is a conceptual diagram illustrating a third exemplary embodiment of a communication system.

Referring to FIG. 4, in the third exemplary embodiment of the communication system, a communication system 400 may support beam-based communication. The communication system 400 may be a cellular communication system. At least some of communication nodes constituting the communication system 400 may perform communication with other communication nodes using a single beam or a multi-beam. Hereinafter, in the description of the third exemplary embodiment of the communication system with reference to FIG. 4, content overlapping with those described with reference to FIGS. 1 to 3 may be omitted.

An exemplary embodiment of the communication system 400 may include a TRP1 411, a TRP2 412, a TRP3 413, and a UE 420. Meanwhile, various types of communication obstacles 431, 432, and 433 such as buildings, people, and other structures may exist in the communication environment. The UE 420 may be connected to or access to any one of the TRP1 to TRP3. The UE 420 may be connected to a communication network or a CN by being connected to any one of the TRP1 to TRP3.

In an exemplary embodiment of the communication system 400, the UE 420 may be simultaneously connected to or access to a plurality of TRPs among the TRP1 to TRP3. The communication system 400 may support dual-connectivity (DC) or multi-connectivity (MC). Here, the DC may mean that the UE 420 is connected to two TRPs at the same time. On the other hand, the MC may mean that the UE 420 is connected to a plurality of TRPs (or multi-TRP) at the same time. It can be seen that the UE 420 being connected to two TRPs at the same time based on MC is equivalent to the UE 420 being connected to two TRPs at the same time based on DC. Hereinafter, configurations described in relation to MC in the present disclosure may be equally or similarly applied to DC.

According to a communication environment condition, one or more TRPs among the TRP1 to TRP3 may be determined as serving TRP(s) for the UE 420. According to a communication environment condition, one or more beams formed by the one or more serving TRPs may be determined as serving beam(s) for the UE 420. As the UE 420 and/or communication obstacles 431, 432, and/or 433 move, one or more serving TRPs and/or one or more serving beams for the UE 420 may change. When a reception strength (e.g., Reference Signal Received Power (RSRP), etc.) of a serving beam (hereinafter, 'first beam') for the UE 420 becomes lower than a reception strength of a neighboring beam (hereinafter, 'second beam') of the first serving beam, beam switching or handover may occur.

For example, the UE 420 may move over time. The UE 420 may be located at a position ① at a time t. The UE 420 may be located at a position ② at a time (t+τ). The UE 420 may be located at a position ③ at a time (t+2τ). The UE 420 may be located at a position ④ at a time (t+3τ). The UE 420 may be located at a position ⑤ at a time (t+4τ).

When the UE 420 is located at the position ①, the UE 420 may be located in the direction in which a beam 411-1 formed by the TRP1 is directed. In this case, the UE 420 may be connected to the TRP1 through the beam 411-1. That is, the TRP1 may be a serving TRP for the UE 420, and the beam 411-1 may be a serving beam for the UE 420. When the UE 420 moves to the position ②, the UE 420 may deviate from the direction in which the serving beam 411-1 is directed, and located in a direction in which a beam 411-2 formed by the TRP1 instead of the beam 411-1. In this case, beam switching may occur, so that the TRP1 may be maintained as the serving TRP for the UE 420, and the beam 411-2 may be a new serving beam for the UE 420, instead of the beam 411-1.

On the other hand, at the position ① and the position ②, the UE 420 may be located in a direction in which a beam 412-1 formed by the TRP2 is directed. However, the beam 412-1 may be blocked by the communication obstacle 431 existing between the UE 420 and TRP2. Accordingly, when the UE 420 is located at the position ① or ②, the TRP2 may not be a serving TRP for the UE 420, and the beam 412-1 may not be a serving beam for the UE 420.

When the UE 420 moves to the position ③, the UE 420 may be located in a direction in which the beam 411-2 formed by the TRP1 is directed, and also may be located in a direction in which a beam 412-2 formed by the TRP2 is directed. In this case, the TRP2 may be added as a new serving TRP for UE 420, and the beam 412-2 may be added as a new serving beam for the UE 420. In other words, the TRP1 and TRP2 may be serving TRPs for the UE 420, and the beam 411-2 and the beam 412-2 may be serving beams for the UE 420. This may mean that the UE 420 is simultaneously connected to the TRP1 and TRP2 based on MC.

When the UE 420 moves to the position ④, the UE 420 may deviate from the direction in which the serving beam 412-2 is directed, and may be located in a direction in which a beam 412-3 formed by the TRP2 is directed. In this case, beam switching may occur, so that the TRP2 may be maintained as the serving TRP for the UE 420, and the beam 412-3 may be a new serving beam for the UE 420 instead of the beam 412-2. On the other hand, at the position ⑤, the UE 420 may leave the coverage of the serving TRP1. In other words, a reception quality of the beams formed by the TRP1 at the UE 420 may be lowered to less than a predetermined reference value. Instead, the UE 420 may be located in a direction in which a beam 413-1 formed by the TRP3 is directed. In this case, handover may occur, so that the TRP3 may be a new serving TRP for the UE 420 instead of the TRP1, and the beam 413-1 may be a new serving for the UE 420.

When UE 420 moves to the position ⑤, UE 420 may deviate from the direction in which the serving beam 413-1 is directed, and may be located in a direction in which a beam 413-2 formed by the TRP3 is directed. In this case, beam switching may occur, so that the TRP3 may be maintained as the serving TRP for UE 420, and the beam 413-3 may be a new serving beam for the UE 420 instead of the beam 413-1. On the other hand, at the position ⑤, the UE 420 may deviate from the direction in which the serving beam 412-3 is directed, and may be located in a direction in which a beam 412-4 formed by the TRP2 is directed. However, the beam 412-4 may be blocked by the communication obstacle 432 existing between the UE 420 and TRP2. Accordingly, when the UE 420 is located at the position ⑤, the TRP2 may not be a serving TRP for the UE 420, and the beam 412-4 may not be a serving beam for the UE 420. That is, at the position ⑤, only one serving beam by one serving TRP may be configured for the UE 420.

In the communication system supporting MC based on multiple TRPs and/or multiple beams, beam switching, handover, or the like may occur due to a change in positions of the communication node and/or communication obstacles. In this reason, a technique capable of efficiently performing management of beam switching, handover, or the like may be required for the communication system supporting MC based on multiple TRPs and/or multiple beams.

Figure 5:
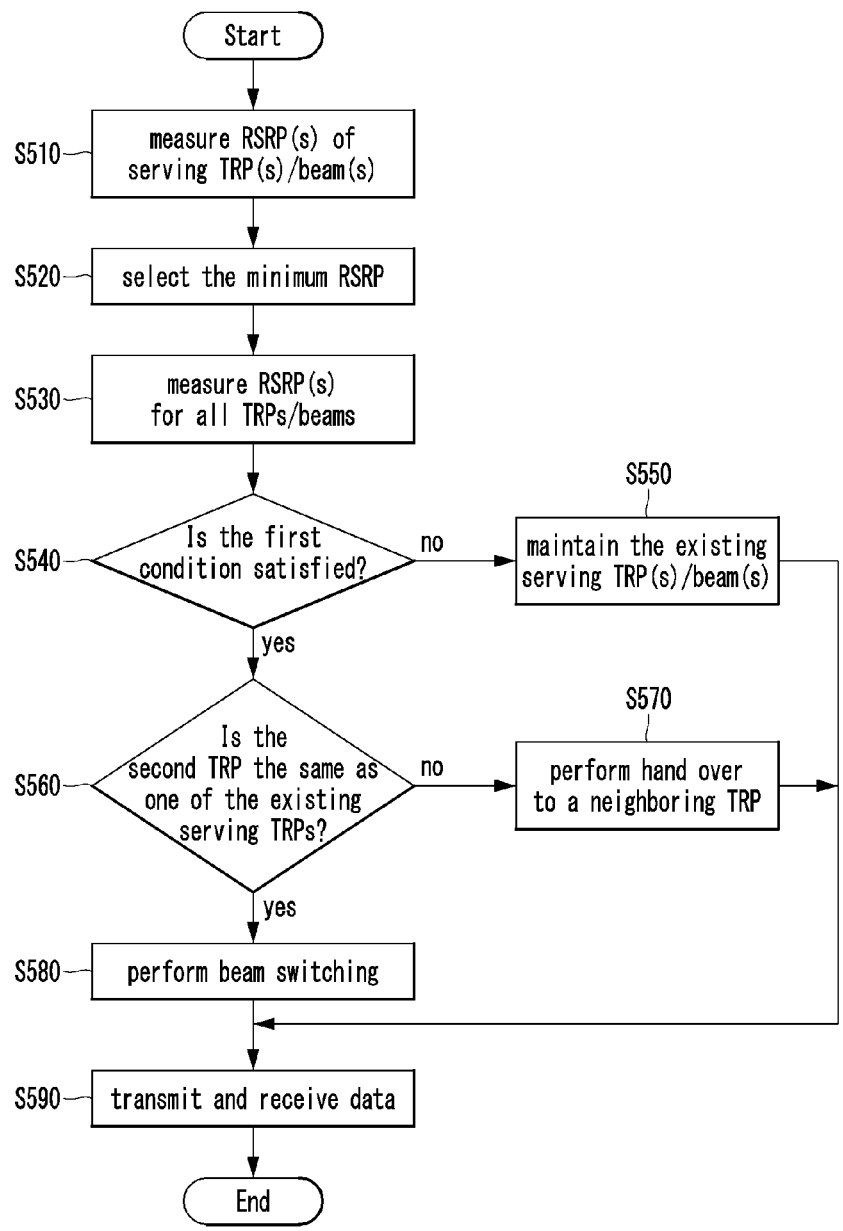
FIG. 5 is a flowchart illustrating a first exemplary embodiment of a beam-based communication method in a communication system.

FIG. 5 is a flowchart illustrating a first exemplary embodiment of a beam-based communication method in a communication system.

Referring to FIG. 5, a communication system may be the same as or similar to the communication system 400 according to the third exemplary embodiment of the communication system described with reference to FIG. 4. Hereinafter, in the description of the first exemplary embodiment of the beam-based communication method with reference to FIG. 5, content overlapping with those described with reference to FIGS. 1 to 4 may be omitted.

The communication system may include one or more TRPs and one or more UEs. Hereinafter, the first exemplary embodiment of the beam-based communication method will be described by taking a situation in which one UE is connected to one or more TRPs as an example. However, this is only an example for convenience of description, and the first exemplary embodiment of the beam-based communication method is not limited thereto.

The UE may be connected to one TRP, or may be connected simultaneously to a plurality of TRPs based on MC. One or more serving TRPs and one or more serving beams may be configured for the UE at the same time. The UE may perform measurement on each of the one or more serving beams formed by the one or more serving TRPs (S510). As a result of performing the measurement according to step S510, the UE may obtain one or more measurement values. The UE may select the smallest measurement value (hereinafter, 'minimum measurement value') from among the one or more measurement values obtained based on step S510 (S520). A serving beam corresponding to the minimum measurement value selected in step S520 may be referred to as a 'first beam', and a serving TRP forming the first beam may be referred to as a 'first TRP'.

For example, a set of all TRPs may be denoted as 'T'. Here, the 'set of all TRPs' may mean a set of all TRPs existing in the communication system, or a set of all TRPs detectable by the UE. The TRPs included in the set T may be collectively denoted as 't'. A set of all beams formed by the TRPs t may be denoted as 'B'. The beams included in the set B may be collectively denoted as 'b'. Among all TRPs and all beams, a set of serving TRPs and a set of serving beams for the UE may be denoted as '$T_s$' and '$B_s$', respectively. The serving TRPs and the serving beams included in the set $T_s$ and the set $B_s$ may be collectively denoted as '$t_s$' and '$b_s$', respectively. When an index of each of the serving TRPs is i, each of the serving TRPs and the serving beams included in the set $T_s$ and the set $B_s$ may be denoted as '$t_{si}$' and '$b_{si}$', respectively. The measurement values obtained in step S510 may correspond to RSRP values ($P_r(t_s, b_a)$) for signals respectively received through one or more serving beams formed by one or more serving TRPs.

The size of MC for the UE may mean or determine how many TRPs the UE can be connected to at the same time. When the size of MC for the UE is determined to be 2, two serving TRPs may be configured for the UE. The two serving TRPs may be referred to as a 'serving TRP #1 (i.e., $t_{s1}$)' and a 'serving TRP #2 (i.e., $t_{s2}$)'. In addition, two serving beams formed by the two serving TRPs may be referred to as a 'serving beam #1 (i.e., $b_{s1}$)' and a 'serving beam #2 (i.e., $b_{s2}$)'. In step S510, the UE may obtain a measurement value #1 and a measurement value #2. Here, the measurement value #1 may correspond to a RSRP value ($P_r(t_{s1}, b_{s1})$) for the serving beam #1 by the serving TRP #1. The measurement value #2 may correspond to a RSRP value ($P_r(t_{s2}, b_{s2})$) for the serving beam #2 by the serving TRP #2. In step S520, the UE may select the smallest measurement value (i.e., minimum measurement value) among the measurement value #1 and the measurement value #2. The selected minimum measurement value may be expressed as in Equation 1.

$$P_{r,min}(t_s,b_s)=\min(P_r(t_{s1},b_{s1}),P_r(t_{s2},b_{s2}))$$ [Equation]

When the size of MC is N (or the number of serving beams configured for the UE is N), Equation 1 may be generalized to be expressed as Equation 2.

$$P_{r,min}(t_s,b_s)=\min(P_r(t_{s1},b_{s1}),\ldots,P_r(t_{sN},b_{sN}))$$ [Equation 2]

The UE may perform measurement on each of all TRPs and all beams of the communication system (S530). In step S530, the UE may obtain one or more measurement values by performing measurement on all received beams. Each of the measurement values obtained in step S530 may correspond to the RSRP value ($P_r(t,b)$) for each of the received beams.

In step S530, the UE may obtain one or more measurement values by respectively performing measurement on beams received through a predetermined beam/TRP search space. In step S530, the UE may obtain measurement values for beams other than the serving beams among the received beams.

The UE may determine whether a first condition is satisfied by comparing the minimum measurement value selected in step S520 and the one or more measurement values obtained in step S530 (S540). In step S540, the UE may that the first condition is satisfied when there is a measurement value greater than a sum of a first offset $O_p$ and the minimum measurement value measured in step S520 among the one or more measurement values obtained in step S530. The first condition may be expressed as Equation 3.

$$P_r(t,b)>P_{r,min}(t_s,b_s)+O_p\forall t\in T,\forall b\in B$$ [Equation 3]

In Equation 3, the first offset $O_p$ may be used as a reference in a beam switching procedure and/or a handover procedure. The first offset may be set identically or differently for a beam switching procedure and a handover procedure. When the first offset is set differently for a beam switching procedure and a handover procedure, it can be seen that a first primary offset $O_{p1}$ is set for a beam switching procedure, and a first secondary offset $O_{p2}$ is set for a handover procedure. That is, the first condition may be divided into a first primary condition for a beam switching procedure and a first secondary condition for a handover procedure.

In the process of determining whether the first condition is satisfied in step S540, the one or more measurement values obtained through measurement on the one or more serving beams in step S510 may not be used as comparison targets. In this case, the first condition may be expressed as Equation 4.

$$P_r(t,b)>P_{r,min}(t_s,b_s)+O_p\forall t\in T,\forall b\in(B-B_s)$$ [Equation 4]

On the other hand, in the process of determining whether the first condition is satisfied according to step S540, one or more measurement values obtained through measurement on beams received from the current serving TRPs may not be used as comparison targets. In this case, the first condition may be expressed as Equation 5.

$$P_r(t,b) > P_{r,min}(t_s,b_s) + O_p \forall t \in (T-T_s), \forall b \in (B-B_s)$$ [Equation 5]

When it is determined in step S540 that the first condition is not satisfied, the beam switching procedure and the handover procedure may not be performed and the existing one or more serving TRPs and one or more serving beams may be maintained (S550). In other words, when there is no other TRP(s) and/or beam(s) having a measurement value superior to those of the serving beams by the existing serving TRPs by a certain degree (i.e., the first offset) or more, the existing serving TRPs and serving beams may be maintained.

On the other hand, when it is determined that the first condition is satisfied in step S540, the UE may identify a beam (hereinafter, 'second beam') corresponding to a measurement value that satisfies the first condition and a TRP (hereinafter, 'second TRP') for forming the second beam. If there are a plurality of measurement values satisfying the first condition in step S540, the UE may select one measurement value from among the plurality of measurement values satisfying the first condition based on a predetermined priority, and determine the second beam and the second TRP. Each of the beams corresponding to the plurality of measurement values satisfying the first condition may be referred to as a 'candidate beam'. The TRP corresponding to the candidate beam may be referred to as a 'candidate TRP'. On the other hand, when there is one measurement value satisfying the first condition, the UE may determine the second beam and the second TRP based on the one measurement value satisfying the first condition.

For setting the priority, one or more criteria may be configured. For example, in an exemplary embodiment of the communication system, the plurality of measurement values may be classified into a first measurement value group, a second measurement value group, a third measurement value group, and the like. Here, a measurement value corresponding to any one of the beams formed by the first TRP may be classified into the first measurement value group. A measurement value corresponding to any one of beams formed by one or more serving TRPs other than the first TRP may be classified into the second measurement value group. A measurement value corresponding to any one of beams formed by one or more neighboring TRPs other than the serving TRPs may be classified into the third measurement value group. In this case, a priority of the first measurement value group may be set as the highest, and a priority of the second measurement value group may be set as the lowest. A priority setting criterion based on the measurement value group classification in this manner according to the TRP classification may be referred to as a 'first criterion'. On the other hand, in an exemplary embodiment of the communication system, a measurement value having a large size among a plurality of measurement values may have a high priority. A priority setting criterion based on the size of the measurement value in this manner may be referred to as a 'second criterion'. The UE may set the priority based on one of the one or more criteria such as the first criterion and the second criterion, or may set the priority by combining a plurality of criteria. For example, the UE may select one or more measurement values corresponding to a measurement value group having a relatively high priority based on the first criterion. If a plurality of measurement values are selected, the UE may select the largest measurement value among the selected measurement values based on the second criterion. However, this is only an example for convenience of description, and the first exemplary embodiment of the beam-based communication method is not limited thereto.

The UE may determine whether the second TRP forming the second beam is the same as any one of the existing one or more serving TRPs (S560). When it is determined that the second TRP is not the same as any one of the existing one or more serving TRPs in step S560 (in other words, when it is identified that the second TRP is a neighboring TRP rather than the existing serving TRP), the UE may perform handover from the first TRP to the second TRP (S570).

When it is determined in step S560 that the second TRP is the same as any one of the one or more existing serving TRPs, the UE may not perform handover. Here, when the second TRP is the same as the first TRP, a beam switching procedure may be performed (S580). In other words, when the second TRP forming the second beam satisfying the first condition is the same as the first TRP forming the first beam that is the existing serving beam, beam switching may be performed. In step S580, the first TRP may be maintained as the serving beam for the UE, and the second beam may be a new serving beam for the UE, instead of the first beam.

On the other hand, when the second TRP is the same as any one serving TRP other than the first TRP among one or more existing serving TRPs, the UE may perform an operation according to step S550. In this case, the existing one or more serving TRPs and one or more serving beams may be maintained without performing a beam switching procedure and a handover procedure. Alternatively, when the second TRP is the same as any one serving TRP other than the first TRP among one or more existing serving TRPs, the UE may terminate the connection to the first TRP through the first beam, and may additionally configure a connection with the second TRP through the second beam. In this case, since the second TRP was also a serving TRP for the UE, the UE and the second TRP may be viewed as being interconnected through two beams at the same time. Alternatively, when the second TRP is the same as any one serving TRP other than the first TRP among one or more existing serving TRPs, the UE may perform step S540 again to newly select a second beam and a second TRP. When step S540 is performed again, the existing second beam may be excluded from the comparison targets.

Through steps S510 to S580, one or more serving TRPs and one or more serving beams for the UE may be determined. The UE may perform uplink data transmission and downlink data reception based on the determined one or more serving TRPs and one or more serving beams (S590).

Figure 6:
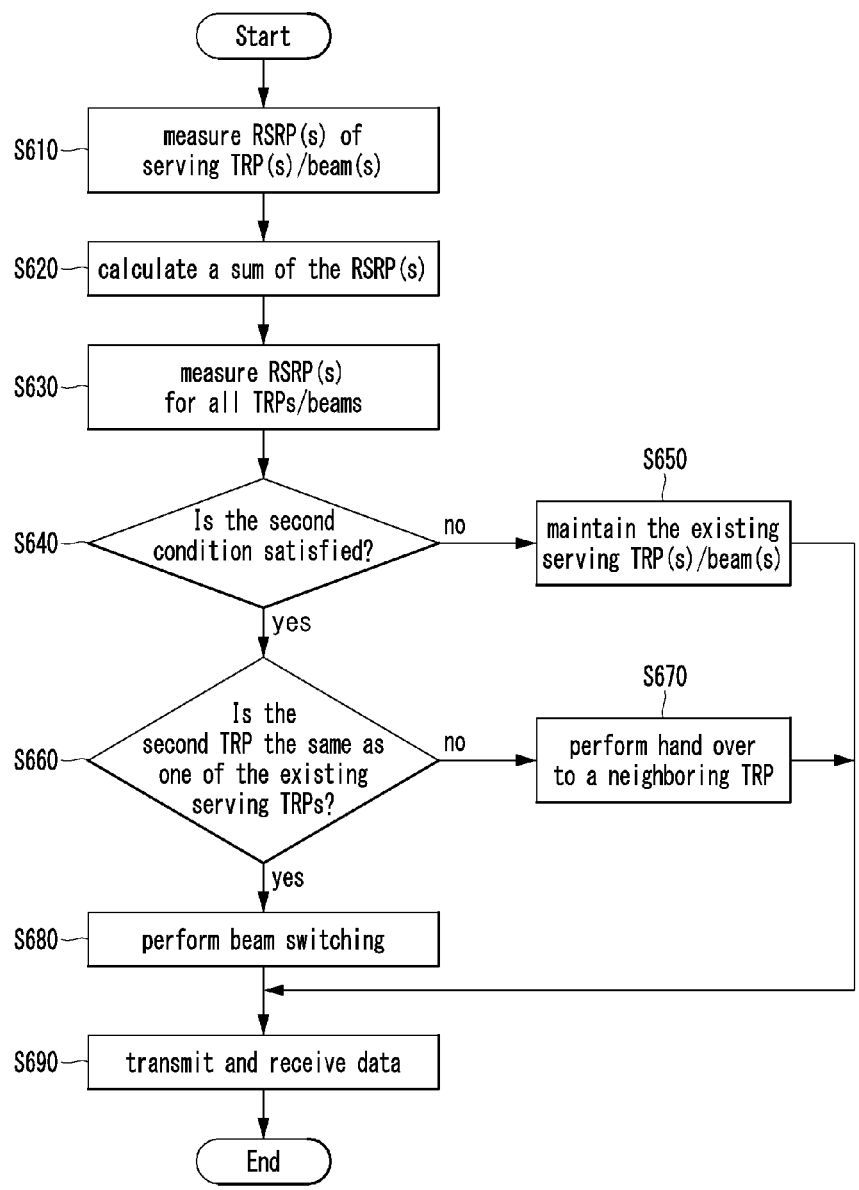
FIG. 6 is a flowchart illustrating a second exemplary embodiment of a beam-based communication method in a communication system.

FIG. 6 is a flowchart illustrating a second exemplary embodiment of a beam-based communication method in a communication system.

Referring to FIG. 6, a communication system may be the same as or similar to the communication system 400 according to the third exemplary embodiment of the communication system described with reference to FIG. 4. Hereinafter, in the description of the second exemplary embodiment of the beam-based communication method with reference to FIG. 6, content overlapping with those described with reference to FIGS. 1 to 5 may be omitted.

The UE may perform measurement on each of one or more serving beams formed by one or more serving TRPs (S610). As a result of performing the measurement according to step S610, the UE may obtain one or more measurement values. A serving beam corresponding to the minimum measurement value among one or more measurement values obtained based on step S610 may be referred to as a 'first beam', and a serving TRP forming the first beam may be referred to as a 'first TRP'. The UE may calculate a sum (hereinafter, 'aggregated measurement value') of the one or more measurement values obtained in step S610 (S620). The aggregated measurement value may be denoted as '$P_{r,sum}(t_s, b_s)$'.

For example, when the size of MC for the UE is determined to be 2 (or when there are two serving beams configured for the UE), the aggregated measurement value in step S620 may be calculated as in Equation 6.

$P_{r,sum}(t_s,b_s) = P_r(t_{s1},b_{s1}) + P_r(t_{s2},b_{s2})$ [Equation 6]

When the size of MC is N (or the number of serving beams configured for the UE is N), Equation 6 may generalized to be expressed as Equation 7.

$$P_{r,sum}(t_s, b_s) = \sum_{i=1}^{N} P_r(t_{si}, b_{si})$$ [Equation 7]

The UE may perform measurement on each of all TRPs and all beams of the communication system (S630). In step S630, the UE may obtain one or more measurement values by performing measurement on all received beams. In step S630, the UE may obtain measurement values for beams other than the serving beams among all the received beams.

In step S630, the UE may obtain the one or more measurement values by performing measurement on beams received through a predetermined beam/TRP search space. In step S630, the UE may obtain measurement values for beams other than the serving beams among the received beams.

The UE may determine whether a second condition is satisfied by comparing the aggregated measurement value calculated in step S620 and the one or more measurement values obtained in step S630 (S640). In step S640, the UE may determine that the second condition is satisfied when there is a measurement value greater than a sum of a second offset $O_a$ and the aggregated measurement value calculated in step S620 among the one or more measurement values obtained in step S630. The second condition may be expressed as Equation 8.

$P_r(t,b) > P_{r,sum}(t_s,b_s) + O_a \forall t \in T, \forall b \in B$ [Equation 8]

In Equation 8, the second offset $O_a$ may be used as a reference for a beam switching procedure and/or a handover procedure. The second offset may be set identically or differently for a beam switching procedure and a handover procedure. When the second offset is set differently for a beam switching procedure and a handover procedure, it can be seen that a second primary offset $O_{a1}$ is set for a beam switching procedure, and a second secondary offset $O_{a2}$ is set for a handover procedure. The second condition may be classified into a second primary condition for a beam switching procedure and a second secondary condition for a handover procedure.

In the process of determining whether the second condition is satisfied according to step S640, the one or more measurement values obtained through measurement on one or more serving beams in step S610 may not be used as comparison targets. In this case, the second condition may be expressed as Equation 9.

$P_r(t,b) > P_{r,sum}(t_s,b_s) + O_p \forall t \in T, \forall b \in (B-B_s)$ [Equation 9]

Meanwhile, in the process of determining whether the second condition is satisfied according to step S640, one or more measurement values obtained through measurement on beams received from the current serving TRPs may not be used as the comparison targets. In this case, the second condition may be expressed as Equation 10.

$P_r(t,b) > P_{r,sum}(t_s,b_s) + O_p \forall t \in (T-T_s), \forall b \in (B-B_s)$ [Equation 10]

When it is determined in step S640 that the second condition is not satisfied, a beam switching procedure and a handover procedure may not be performed, and the existing one or more serving TRPs and one or more serving beams may be maintained (S650). In other words, when there is no TRP and/or beam having a measurement value superior to the sum of the measurement values for the serving beams by the existing serving TRPs by a certain degree (i.e., second offset) or more, the existing serving TRPs and serving beams may be maintained.

On the other hand, when it is determined that the second condition is satisfied in step S640, the terminal may identify a beam (hereinafter, 'third beam') corresponding to a measurement value satisfying the second condition and a TRP (hereinafter, 'third TRP') for forming the third beam. When there are a plurality of measurement values satisfying the second condition in step S640, the UE may determine a third beam and a third TRP by selecting one measurement value from among the plurality of measurement values satisfying the second condition based on a predetermined priority. On the other hand, when there is one measurement value satisfying the second condition, the UE may determine the third beam and the third TRP based on the one measurement value satisfying the second condition.

The UE may determine whether the third TRP forming the third beam is the same as any one of the existing one or more serving TRPs (S660). When it is determined that the third TRP is not the same as any one of the existing one or more serving TRPs in step S660 (in other words, when it is identified that the third TRP is a neighboring TRP rather than the existing serving TRP), the UE may perform handover from the first TRP to the third TRP (S670).

When it is determined in step S660 that the third TRP is the same as any one of the existing one or more serving TRPs, the UE may not perform handover. Here, when the third TRP is the same as the first TRP, a beam switching procedure may be performed (S670). In step S670, the first TRP may be maintained as the serving beam for the UE, and the third beam may be a new serving beam for the UE instead of the first beam.

On the other hand, when the third TRP is the same as any one serving TRP other than the first TRP among the one or more existing serving TRPs, the UE may perform the operation according to step S650. Alternatively, when the third TRP is the same as any one serving TRP other than the first TRP among the one or more existing serving TRPs, the UE may perform step S640 again to select a new third beam and a new third TRP. When step S640 is performed again, the existing third beam may be excluded from the comparison targets.

Through steps S610 to S680, one or more serving TRPs and one or more serving beams for the UE may be determined. The UE may perform uplink data transmission and downlink data reception based on the determined one or more serving TRPs and one or more serving beams (S690).

In the first exemplary embodiment of the beam-based communication method described with reference to FIG. 5, whether to trigger beam switching and/or handover may be determined based on a result of comparison between a measurement value of a serving beam for each individual serving TRP and beam measurement values for other TRPs. This may be referred to as 'triggering based on per-TRP measurement value'. According to the first exemplary embodiment of the beam-based communication method, the UE may always have connections with the best TRPs. In this case, performance of data communication may be improved, but beam switching and/or handover may occur relatively frequently.

On the other hand, in the second exemplary embodiment of the beam-based communication method described with reference to FIG. 6, based on a result of comparison between the aggregated measurement value summing the serving beam measurement values for all serving TRPs and the beam measurement values for other TRPs, whether to trigger beam switching and/or handover may be determined. This may be referred to as 'aggregated measurement value-based triggering'. According to the second exemplary embodiment of the beam-based communication method, the UE may always have connections with TRPs having a relatively excellent measurement value at a corresponding time point. In this case, the frequency of beam switching and/or handover may be reduced.

For example, when the number of TRPs simultaneously connected to the UE is large and there are many line-of-sight (LoS) links between the TRPs and the UE, a need for beam switching and handover may be relatively reduced. In this case, the frequency of beam switching and/or handover may be reduced by applying the second exemplary embodiment of the beam-based communication method rather than the first exemplary embodiment of the beam-based communication method. As described above, communication performance can be improved by selectively applying various exemplary embodiments of the beam-based communication method according to a communication environment condition.

Figure 7:
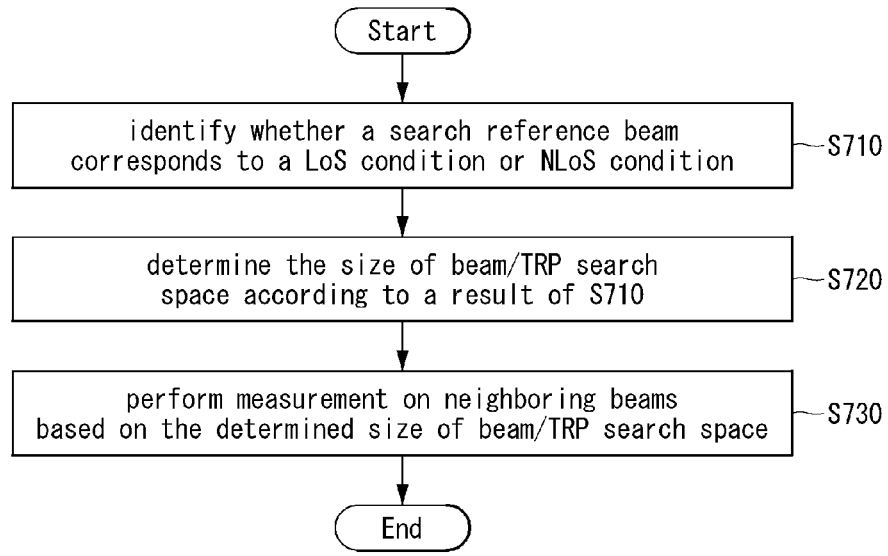
FIG. 7 is a flowchart illustrating a third exemplary embodiment of a beam-based communication method in a communication system.

FIG. 7 is a flowchart illustrating a third exemplary embodiment of a beam-based communication method in a communication system.

Referring to FIG. 7, a communication system may be the same as or similar to the communication system 400 according to the third exemplary embodiment of the communication system described with reference to FIG. 4. Hereinafter, in the description of the third exemplary embodiment of the beam-based communication method with reference to FIG. 7, content overlapping with those described with reference to FIGS. 1 to 6 may be omitted.

The UE may obtain one or more measurement values by performing measurement on received beams. The UE may determine whether to perform beam switching and/or handover by comparing measurement values of one or more serving beams among the obtained measurement values with other measurement values. For example, in an exemplary embodiment of the communication system, the UE may obtain one or more measurement values (hereinafter, 'serving beam measurement values') by performing measurement on one or more serving beams formed by one or more serving TRPs. This may be the same as or similar to the operation in step S510 described with reference to FIG. 5 or step S610 described with reference to FIG. 6.

On the other hand, the UE may obtain one or more measurement values by performing measurement on beams other than the serving beams among the received beams. The UE may obtain the one or more measurement values by performing measurement on one or more beams received within a predetermined beam/TRP search space configured for each TRP. This may be the same as or similar to the operation in step S530 described with reference to FIG. 5 or step S630 described with reference to FIG. 6.

Here, the beam/TRP search space may be configured around a search reference beam determined for each TRP. In the case of the serving TRP, the corresponding serving beam may correspond to a search reference beam. On the other hand, in case of a TRP (i.e., neighboring TRP) other than the serving TRP, a beam through which a signal (e.g., synchronization signal block (SSB), etc.) from the corresponding TRP is first received, or a beam on which measurement is first performed among the beams from the corresponding TRP may be a search reference beam.

The size of the beam/TRP search space may mean the maximum interval between the search reference beam and measurement target beams. When the size of the beam/TRP search space is 1, beams corresponding to indexes i−1, i, and i+1 around the index i of the search reference beam may be determined as measurement target beams. In other words, when the size of the beam/TRP search space is 1, measurement on one or more beams immediately adjacent to the search reference beam (or adjacent to the search reference beam) and the search reference beam may be performed. Meanwhile, when the size of the beam/TRP search space is a natural number N greater than 1, beams corresponding to indexes i−N to i+N around the index i of the search reference beam may be determined as measurement target beams. In other words, when the size of the beam/TRP search space is N, one or more beams spaced apart from the search reference beam by a maximum of N, including the search reference beam, may be determined as measurement target beams. The size of the beam/search space may be flexibly determined for each TRP according to whether the search reference beam for each TRP corresponds to a LoS condition or a non-LOS (NLoS) condition.

When a TRP for which beam search is to be performed is a serving TRP, a search reference beam for the corresponding TRP may be a current serving beam therefor. In this case, measurement may be performed on the remaining beams excluding the search reference beam among beams received in the beam/search space. Alternatively, the beam/TRP search space for the corresponding TRP may be configured not to include the search reference beam.

In an exemplary embodiment of the communication system, the terminal may identify whether a search reference beam for a fourth TRP for which beam search is to be performed corresponds to the LoS condition or the NLoS condition (S710). The UE may determine the size of the beam/TRP search space for the fourth TRP based on a result of the identification in step S710 (S720). The UE may measure one or more beams (e.g., neighboring beams) received in the beam/TRP search space based on the size of the beam/TRP search space determined in step S720 (S730).

Specifically, when the search reference beam corresponds to the LoS condition, the UE may determine the size of the beam/TRP search space to be 1. When the size of the beam/TRP search space is 1, the UE may measure only one or more beams having an interval of 1 or less from the search reference beam among the beams received from the fourth TRP.

Meanwhile, when the search reference beam corresponds to the NLoS condition, in step S720, the UE may set the size of the beam/TRP search space to a natural number N greater than 1. When the size of the beam/TRP search space is N, the UE may measure one or more beams having an interval of N or less from the search reference beam in step S730.

Meanwhile, the UE may compare a probability that beam switching occurs (hereinafter, 'beam switching probability')

and a probability that a handover occurs (hereinafter, 'handover probability'). When it is determined that the beam switching probability is higher than the handover probability, the UE may determine a priority of beam search for serving TRPs to be higher than a priority of beam search for neighboring TRPs. On the other hand, when it is determined that the handover probability is higher than the beam switching probability, the UE may determine the priority of beam search for neighboring TRPs to be higher than the priority of beam search for serving TRPs.

Specifically, the priority setting criterion used to determine the second beam described with reference to FIG. 5 (or the third beam described with reference to FIG. 6) may include a third criterion. According to the third criterion, when it is determined that the beam switching probability is higher than the handover probability, the UE may preferentially select beams received from the serving TRPs rather than beams received from the neighboring TRPs as the second beam (or third beam). On the other hand, when it is determined that the handover probability is higher than the beam switching probability, the UE may preferentially select beams received from neighboring TRPs as the second beam (or the third beam) rather than beams received from the serving TRPs.

Alternatively, when it is determined that the beam switching probability is higher than the handover probability, the UE may set the size of the beam/TRP search space for serving TRPs to be relatively larger than the size of the beam/TRP search space for neighboring TRPs. On the other hand, when it is determined that the handover probability is higher than the beam switching probability, the UE may set the size of the beam/TRP search space for neighboring TRPs to be relatively larger than the size of the beam/TRP search space for serving TRPs.

The UE may compare the beam switching probability and the handover probability by calculating values of the beam switching probability and/or the handover probability based on a predetermined calculation scheme. Alternatively, the UE may perform the comparison between the beam switching probability and the handover probability based on information on a communication environment. Here, the information on the communication environment may include information on locations of at least some of the UE, serving TRPs, neighboring TRPs, and communication obstacles existing in the communication environment. Alternatively, the information on the communication environment may include one or more measurement values for one or more beams that the UE receives from at least some of the serving TRPs and the neighboring TRPs, or information on a rate of change of the one or more measurement values.

For example, based on the information on the communication environment, the UE may determine whether the UE moves to a location closer to any one neighboring TRP than a specific serving TRP. When it is determined that the UE moves to a location closer to any one neighboring TRP than a specific serving TRP, the UE may determine that the handover probability is higher than the beam switching probability. On the other hand, when it is not determined that the UE moves to a location closer to a specific neighboring TRP than a specific serving TRP (e.g., when it is determined that the UE does not leave an area where communication with the specific serving TRP is easy while moving), the UE may determine that the beam switching probability is higher than the handover probability.

Figure 8:
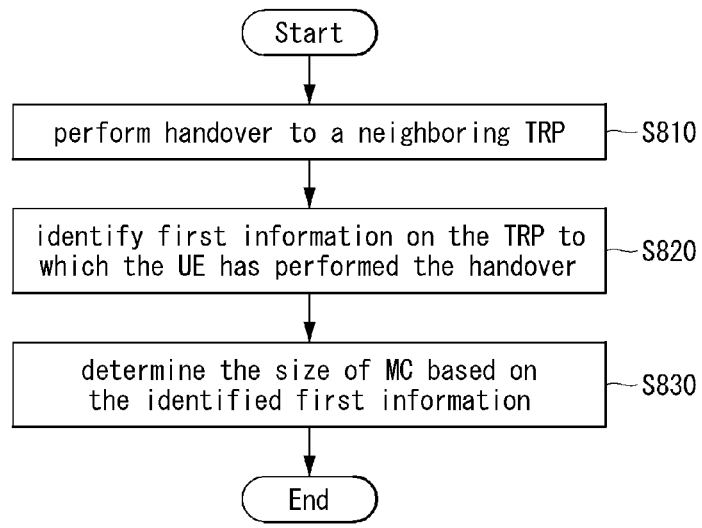
FIG. 8 is a flowchart illustrating a fourth exemplary embodiment of a beam-based communication method in a communication system.

FIG. 8 is a flowchart illustrating a fourth exemplary embodiment of a beam-based communication method in a communication system.

Referring to FIG. 8, a communication system may be the same as or similar to the communication system 400 according to the third exemplary embodiment of the communication system described with reference to FIG. 4. Hereinafter, in the description of the fourth exemplary embodiment of the beam-based communication method with reference to FIG. 8, content overlapping with those described with reference to FIGS. 1 to 7 may be omitted.

In an exemplary embodiment of the communication system, the size of MC for the UE may mean or determine how many TRPs the UE may be connected to at the same time. For example, when the size of MC for the UE is a natural number m, the UE may have connections with up to m TRPs at the same time. Here, the size of C for the UE may be flexibly or adaptively determined when the UE performs handover.

The UE may perform handover from one of the one or more serving TRPs to a neighboring TRP (S810). The UE may identify first information on the TRP to which the UE has performed the handover (hereinafter, fifth TRP) (S820). The first information on the fifth TRP may include one or more types of information. For example, the first information may include information on the characteristics of traffic transmitted and received through the fifth TRP, quality of service (QoS) for the traffic, and the like. The first information may include information on a service environment, a channel environment, and the like. The first information may include information on a TRP density. The first information may include information on a probability of securing a LoS link according to movement of the UE.

The UE may determine the parameter m for the size of MC based on the first information identified in step S820 (S830). For example, when the traffic is URLLC traffic, the UE may set the size (or m) of MC to be large. Meanwhile, when a reliability condition and/or latency condition for the traffic is relatively low, the UE may set the size of MC to be relatively small. However, this is only an example for convenience of description, and the fourth exemplary embodiment of the beam-based communication method is not limited thereto.

If the size of MC determined in step S830 after the handover is larger than the size of the existing MC, the UE may access an additional serving TRP through an additional serving beam based on the determined size of the MC. On the other hand, if the size of MC determined in step S830 after the handover is smaller than the size of the existing MC, the UE may stop a part of accesses to the existing serving beams and/or the serving TRPs. As described above, as the size of MC is adaptively determined based on the communication environment or communication condition, communication performance between the plurality of TRPs and the UE based on the MC may be improved.

Figure 9:
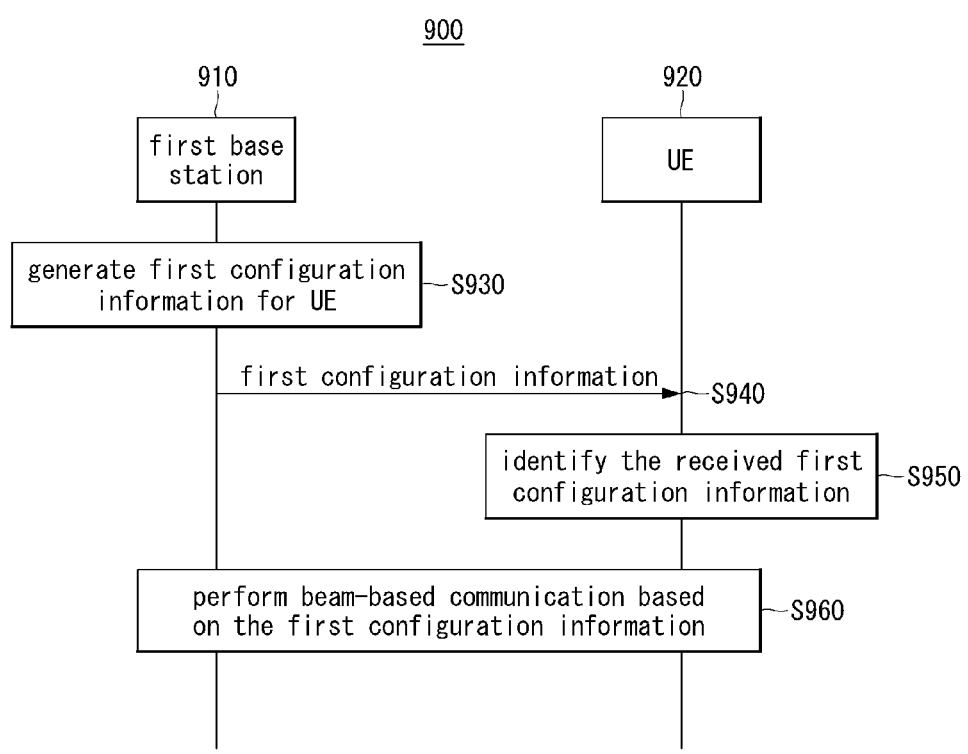
FIG. 9 is a sequence chart illustrating a fifth exemplary embodiment of a beam-based communication method in a communication system.

FIG. 9 is a sequence chart illustrating a fifth exemplary embodiment of a beam-based communication method in a communication system.

Referring to FIG. 9, a communication system may be the same as or similar to the communication system 400 according to the third exemplary embodiment of the communication system described with reference to FIG. 4. Hereinafter, in the description of the fifth exemplary embodiment of the beam-based communication method with reference to FIG. 9, content overlapping with those described with reference to FIGS. 1 to 8 may be omitted.

The communication system 900 may include one or more base stations and one or more UEs. Here, the base station may be a concept encompassing TRP. The configurations described with respect to the TRP in FIGS. 3 to 8 may be equally or similarly applied to the base station. Hereinafter, the fifth exemplary embodiment of the beam-based communication method will be described with reference to a case in which a plurality of TRPs included in one or more base stations and one UE included in the communication system 900 perform communication based on MC as an example. However, this is only an example for convenience of description, and the fifth exemplary embodiment of the beam-based communication method is not limited thereto.

An exemplary embodiment of the communication system 900 may include a plurality of TRPs included in one or more base stations. For example, the communication system 900 may include a first base station 910 and a UE 920. The first base station 910 may include a plurality of TRPs. Alternatively, the communication system 900 may include a plurality of base stations including the first base station 910 and each of the plurality of base stations may correspond to one or more TRPs respectively.

Among a plurality of TRPs included in one or more base stations, there may be a plurality of serving TRPs configured for the UE 920 at the same time. The first TRP 910 may be one of the plurality of serving TRPs for the UE 920.

The first base station 910 may generate first configuration information for beam-based communication of the UE 920 (S930). The first base station 910 may transmit the first configuration information to the UE 920 (S940). The first base station 910 may transmit the first configuration information to the UE 920 trough a first serving TRP included in the first base station 910. The UE 920 may identify the first configuration information received from the first base station 910 (S950). The first base station 910 and the UE 920 may perform beam-based communication based on the first configuration information (S960).

The first configuration information may include one or more types of information required for the UE 920 to perform beam-based communication. The first configuration information may include information required for the UE 920 to operate according to at least one of the first to fourth exemplary embodiments of the beam-based communication method described with reference to FIGS. 5 to 8. When the first configuration information includes a plurality of types of information, in step S940, the first base station 910 may transmit a first signal including the first configuration information including the plurality of types of information to the UE 920. Alternatively, in step S940, the first base station 910 may transmit a plurality of signals including the plurality of types of information included in the first configuration information to the UE 920, respectively.

For example, the first configuration information may include information required for the UE 920 to operate according to the first exemplary embodiment of the beam-based communication method described with reference to FIG. 5 or the second exemplary embodiment of the beam-based communication method described with reference to FIG. 6. The first configuration information may include information instructing to perform determination on whether a first condition or a second condition is satisfied based on a result of comparison between a first reference value and a plurality of beam measurement values obtained by the UE 920 measuring a plurality of beams received from a plurality of TRPs included in the communication system 900. Here, the first condition may be the same as or similar to the first condition in the first exemplary embodiment of the beam-based communication method described with reference to FIG. 5. The second condition may be the same as or similar to the second condition in the second exemplary embodiment of the beam-based communication method described with reference to FIG. 6.

When the first configuration information includes the information instructing to perform determination on whether the first condition is satisfied, the first reference value may correspond to a sum of a first offset and a minimum measurement value among the plurality of serving beam measurement values that the UE 920 receives from the plurality of serving TRPs. When the first configuration information includes the information instructing to perform determination on whether the second condition is satisfied, the first reference value may correspond to a sum of a second offset and the minimum measurement value among the plurality of serving beam measurement values that the UE 920 receives from the plurality of serving TRPs.

The information instructing to determine whether the first condition is satisfied (or information instructing to determine whether the second condition is satisfied) may instruct the UE 920 to determine that the first condition (or the second condition) is satisfied, when one or more measurement values greater than the first reference value exist among the plurality of beam measurement values. Alternatively, the information instructing to determine whether the first condition is satisfied (or information instructing to determine whether the second condition is satisfied) may instruct the UE 920 to determine that the first condition (or the second condition) is satisfied, when one or more measurement values greater than the first reference value and not corresponding to serving beams exist among the plurality of beam measurement values.

The first configuration information may include information instructing the UE 920 to perform either beam switching or handover based on a result of the determination of the UE 920 on whether the second TRP forming the first beam satisfying the first condition (or the second condition) is the same as any one of the plurality of serving TRPs.

When there are a plurality of measurement values satisfying the first condition (or second condition), each of the beams corresponding to the measurement values satisfying the first condition (or second condition) may be referred to as a 'candidate beam', and a TRP corresponding to the candidate beam may be referred to as a 'candidate TRP'. The first configuration information may include information on one or more criteria necessary for the UE 920 to determine a priority for selecting the first beam from among a plurality of candidate beams.

The first configuration information may include information required for the UE 920 to operate according to the third exemplary embodiment of the beam-based communication method described with reference to FIG. 7. For example, the first configuration information may include information related to a size of a beam search space for at least some of a plurality of TRPs included in the communication system 900. Here, the size of the beam search space may be determined based on whether a LoS condition or NLoS condition of a search reference beam for each of the plurality of TRPs is applied. The first configuration information may include information on a selection criterion of a search reference beam for each of the plurality of TRPs.

The first configuration information may include information required for the UE 920 to operate according to the fourth exemplary embodiment of the beam-based communication method described with reference to FIG. 8. For example, the first configuration information may include information instructing the UE 920 to determine the number of TRPs to which the UE 920 is connected at the same time based on the first information on a TRP to which the UE has performed handover, when the UE 920 has performed hand over from one of the serving TRPs to the neighboring TRP.

According to the exemplary embodiments of the beam-based communication method and apparatus, in a communication system using a multi-beam, a UE may be connected to one or more serving beams formed by one or more serving TRPs at the same time based on multi-connectivity. The UE can efficiently determine whether to perform beam switching or handover, whether to maintain a serving beam, and/or the like by comparing measurement values for the one or more serving beams received from the one or more serving TRPs and measurement values for other received beams. Meanwhile, the UE can reduce a time required for beam search and improve efficiency of beam search operations by flexibly determining the size of a beam/TRP search space for beam and/or TRP search.

However, the effects that can be achieved by the beam-based communication method and apparatus in the communication system according to the exemplary embodiments of the present disclosure are not limited to those mentioned above, and other effects not mentioned may be clearly understood by those of ordinary skill in the art to which the present disclosure belongs from the configurations described in the present disclosure.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. An operation method of a terminal in a communication system, the operating method comprising:
   obtaining a plurality of serving beam measurement values by performing measurement on a plurality of serving beams received from a plurality of serving transmission and reception points (TRPs) providing a service to the terminal;
   identifying a minimum measurement value among the plurality of serving beam measurement values;
   obtaining a plurality of beam measurement values by performing measurement on a plurality of beams received from a plurality of TRPs included in the communication system;
   determining whether a first condition is satisfied, the first condition being defined based on a result of comparison between the plurality of beam measurement values and a sum of the minimum measurement value and a first offset; and
   in response to determining that the first condition satisfied, performing communication with at least part of the plurality of serving TRPs and a first TRP forming a first beam satisfying the first condition.

2. The operation method according to claim 1, wherein the determining of whether the first condition is satisfied comprises: determining that the first condition is satisfied when there is one or more measurement values greater than the sum of the minimum measurement value and the first offset among the plurality of beam measurement values.

3. The operation method according to claim 1, wherein the determining of whether the first condition is satisfied comprises: determining that the first condition is satisfied when there is one or more measurement values that are greater than the sum of the minimum measurement value and the first offset and do not correspond to the plurality of serving TRPs among the plurality of beam measurement values.

4. The operation method according to claim 1, wherein the determining of whether the first condition is satisfied comprises:
   when there are a plurality of measurement values satisfying the first condition, performing comparison between priorities of a plurality of candidate beams corresponding to the plurality of measurement values satisfying the first condition based on one or more criteria; and
   determining the first beam among the plurality of candidate beams based on a result of the comparison between the priorities.

5. The operation method according to claim 4, wherein the one or more criteria include at least one of a first criterion according to TRP classification, a second criterion according to a measurement value size, and a third criterion according to a comparison result with respect to a beam switching probability or a handover probability.

6. The operation method according to claim 1, wherein the obtaining of the plurality of beam measurement values comprises:
   determining a size of a beam search space for each of the plurality of TRPs;
   identifying a beam search space for each of the plurality of TRPs based on the determined size of the beam search space size; and identifying the plurality of beam measurement values by performing measurement on the plurality of beams received from the plurality of TRPs based on the identified beam search spaces.

7. The operation method according to claim 6, wherein the determining of the size of the beam search space comprises:
identifying a search reference beam for each of the plurality of TRPs;
identifying whether the search reference beam for each of the plurality of TRPs satisfies a line-of-sight (LoS) condition or non-LoS (NLoS) condition; and
determining the size of the beam search space based on a result of the identifying of whether the search reference beam satisfies the LoS condition or NLoS condition.

8. The operation method according to claim 1, wherein the performing of the communication comprises:
identifying whether the first TRP forming the first beam is identical to any one of the plurality of serving TRPs; and
performing a handover procedure from a second TRP to the first TRP when the first TRP is not identical to any one of the plurality of serving TRPs, the second TRP forming a second beam corresponding to the minimum measurement value.

9. The operation method according to claim 8, wherein the performing of the communication comprises:
identifying first information on the first TRP after performing the handover procedure to the first TRP; and
determining a number of TRPs to which the terminal is simultaneously connected, based on the identified first information.

10. The operation method according to claim 1, wherein the performing of the communication comprises:
identifying whether the first TRP forming the first beam is identical to any one of the plurality of serving TRPs; and
performing a beam switching procedure from a second beam corresponding to the minimum measurement value to the first beam, when the first TRP is identical to a second TRP forming the second beam among the plurality of serving TRPs.

11. The operation method according to claim 1, further comprising, after the determining of whether the first condition is satisfied, in response to determining that the first condition is not satisfied, maintaining connections to the plurality of serving TRPs and the plurality of serving beams.

12. The operation method according to claim 1, wherein each of the plurality of serving beam measurement values and the plurality of beam measurement values corresponds to a Reference Signal Received Power (RSRP) measured based on a signal received through a corresponding beam.

13. The operation method according to claim 1, further comprising, before the obtaining of the plurality of beam measurement values,
receiving second information from a third TRP among the plurality of serving TRPs; and
identifying the received second information,
wherein the second information includes information instructing the terminal to determine whether the first condition is satisfied based on the measurement on the plurality of beams.

14. A terminal in a communication system, comprising a processor, wherein the processor causes the terminal to:
obtain a plurality of serving beam measurement values by performing measurement on a plurality of serving beams received from a plurality of serving transmission and reception points (TRPs) providing a service to the terminal;
calculate an aggregated measurement value corresponding to a sum of the plurality of serving beam measurement values;
obtain a plurality of beam measurement values by performing measurement on a plurality of beams received from a plurality of TRPs included in the communication system;
determine whether a first condition is satisfied, the first condition being defined based on a result of comparison between the plurality of beam measurement values and a sum of the aggregated measurement value and a first offset; and
in response to determining that the first condition satisfied, perform communication with at least part of the plurality of serving TRPs and a first TRP forming a first beam satisfying the first condition.

15. The terminal according to claim 14, wherein in the determining of whether the first condition is satisfied, the processor further causes the terminal to determine that the first condition is satisfied, when there is one or more measurement values greater than the sum of the aggregated measurement value and the first offset among the plurality of beam measurement values.

16. The terminal according to claim 14, wherein in the performing of the communication, the processor further causes the terminal to perform one of handover or beam switching based on a result of determining whether the first TRP forming the first beam is identical to any one of the plurality of serving TRPs.

17. An operation method of a first transmission and reception point (TRP) in a communication system, the operation method comprising:
transmitting first information to a terminal to which a plurality of serving TRPs including the first TRP provide a service; and
performing communication with the terminal based on a result of determination on whether a first condition is satisfied, the determination being performed by the terminal based on the first information,
wherein the first condition is defined based on a result of comparison between a first reference value and a plurality of beam measurement values obtained by performing measurement on a plurality of beams received from a plurality of TRPs included in the communication system, the first reference value being determined based on a plurality of serving beam measurement values that the terminal obtains by performing measurement on a plurality of serving beams received from the plurality of serving TRPs, and
wherein the first information includes information instructing the terminal to determine whether the first condition is satisfied based on the measurement on the plurality of beams.

18. The operation method according to claim 17, wherein the information instructing to determine whether the first condition is satisfied instructs the terminal to determine that the first condition is satisfied when there is one or more measurement values greater than the first reference value among the plurality of beam measurement values, and the first reference value is defined as one of a sum of a first offset and a minimum measurement value among the plurality of serving beam measurement values or a sum of a second offset and an aggregated measurement value corresponding to a sum of the plurality of serving beam measurement values.

19. The operation method according to claim 17, wherein the first information further includes information related to a size of a beam search space for each of the plurality of TRPs, the beam search space being for the terminal to perform the measurement on the plurality of beams, and the size of the beam search space is determined based on whether a search reference beam for each of the plurality of TRPs satisfies a line-of-sight (LoS) condition or non-LoS (NLoS) condition.

20. The operation method according to claim 17, wherein the first information further includes information instructing the terminal to perform one of handover or beam switching based on a result of determining whether a second TRP forming a first beam satisfying the first condition is identical to any one of the plurality of serving TRPs.

* * * * *